(12) United States Patent
Iwadate et al.

(10) Patent No.: US 7,388,050 B2
(45) Date of Patent: Jun. 17, 2008

(54) PROTON CONDUCTOR AND METHOD FOR PRODUCING THE SAME

(75) Inventors: Hitoshi Iwadate, Shiki (JP); Yuji Isogai, Iruma-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 403 days.

(21) Appl. No.: 11/021,714

(22) Filed: Dec. 23, 2004

(65) Prior Publication Data

US 2005/0143530 A1 Jun. 30, 2005

(30) Foreign Application Priority Data

Dec. 25, 2003 (JP) .............................. 2003-429606

(51) Int. Cl.
*C08F 8/30* (2006.01)
(52) U.S. Cl. .................. 525/180; 524/606; 524/609; 525/189; 525/326.2; 525/351; 525/353; 525/380
(58) Field of Classification Search ................ 525/180, 525/189, 326.2, 351, 353, 380; 524/606, 524/609
See application file for complete search history.

(56) References Cited

U.S. PATENT DOCUMENTS

| 6,248,469 B1 * | 6/2001 | Formato et al. ................ 429/41 |
| 7,112,363 B2 * | 9/2006 | Moya ....................... 428/304.4 |
| 2003/0035991 A1 | 2/2003 | Colombo et al. |

FOREIGN PATENT DOCUMENTS

| EP | 1 202 365 A1 | 5/2002 |
| JP | 2002-083514 | 3/2002 |
| JP | 2002-083612 | 3/2002 |
| JP | 2002-324559 | 11/2002 |
| JP | 2003-132908 | 5/2003 |
| JP | 2003-183244 | 7/2003 |
| JP | 2005-174800 | 6/2005 |
| WO | WO-00/54351 | 9/2000 |

OTHER PUBLICATIONS

Japanese Office Action for Application No. 2003-429606, dated Oct. 9, 2007.

* cited by examiner

*Primary Examiner*—Bernard Lipman
(74) *Attorney, Agent, or Firm*—Lahive & Cockfield, LLP; Anthony A. Laurentano, Esq.

(57) ABSTRACT

A hyperbranch polymer is bonded to a pore surface existing on a $SiO_2$ glass porous body, such that the hyperbranch polymer is bonded to the pore surface only at the base end moiety. The hyperbranch polymer has a first generation branched moiety branched from the base end moiety, a second generation branched moiety further branched from the first generation branched moiety, and a third generation branched moiety further branched from the second generation branched moiety. A functional group, such as sulfonic acid group, from which a proton is capable of being dissociated, is bonded by substitution to the terminal end of the third generation branched moiety.

7 Claims, 11 Drawing Sheets

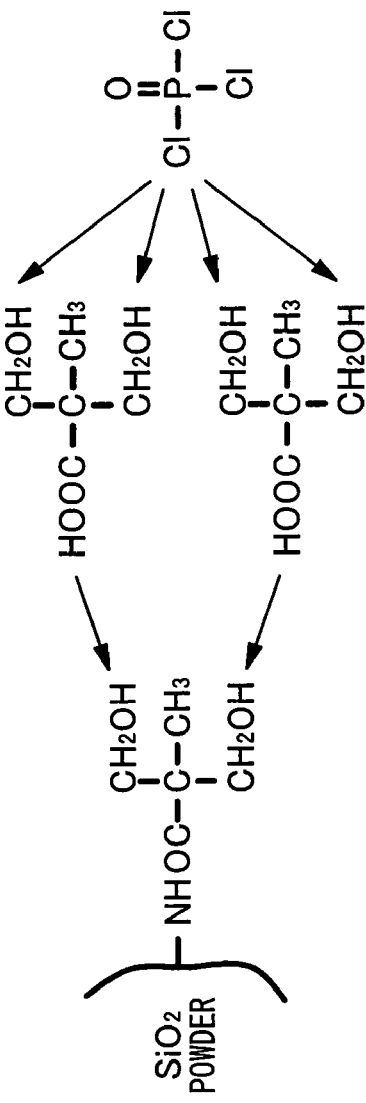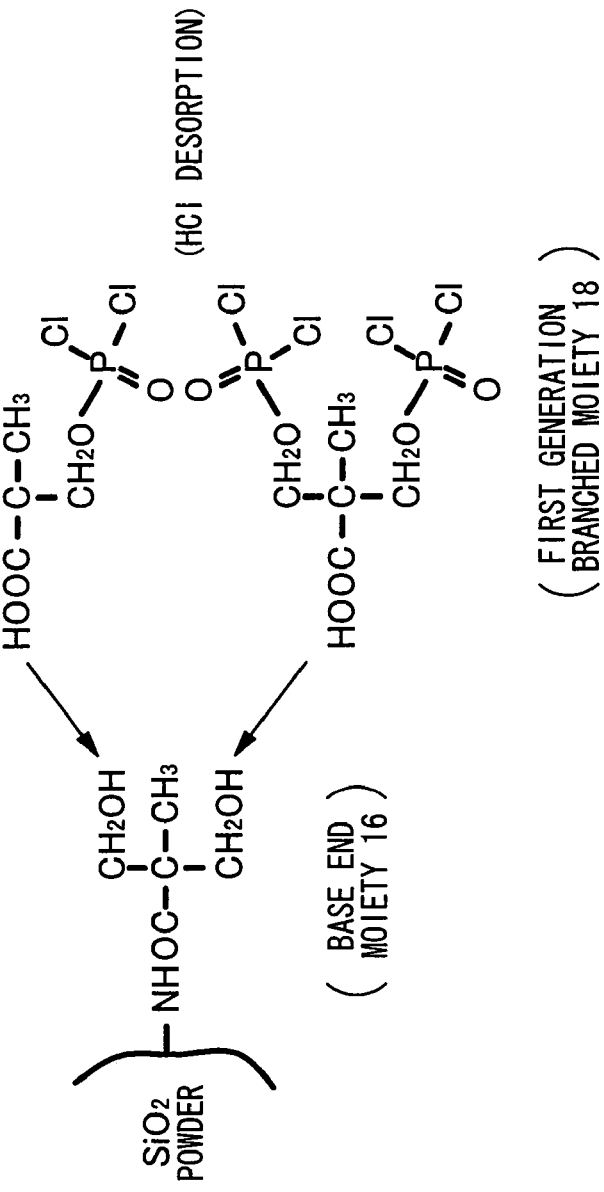
FIG. 6A
FIG. 6B

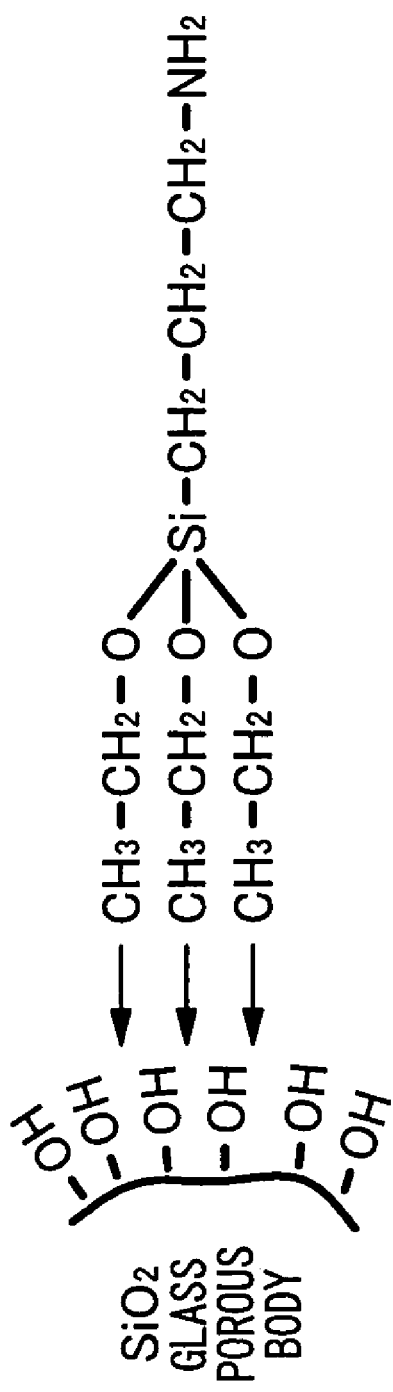
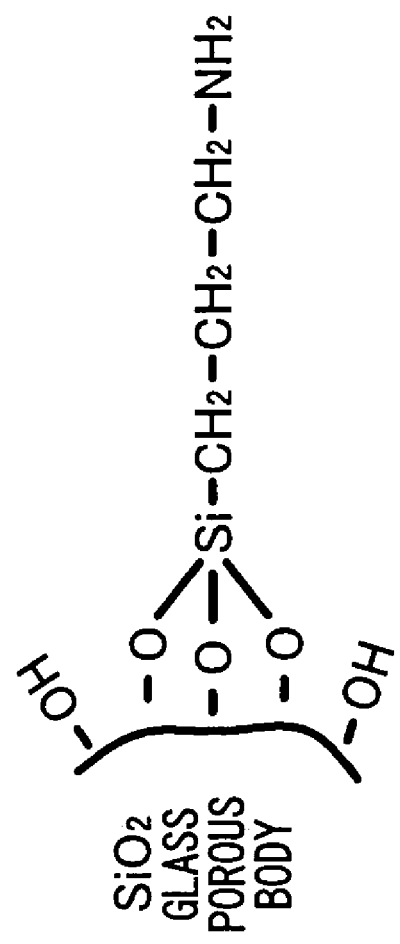
FIG. 9A
FIG. 9B

PROTON CONDUCTOR AND METHOD FOR PRODUCING THE SAME

BACKGROUND OF THE INVENTION

1. Field of the Invention

The present invention relates to a proton conductor in which a polymer is bonded to pores of a porous body, and a method for producing the same.

2. Description of the Related Art

In recent years, it has been attempted to use a proton conductor as an electrolyte for a fuel cell. In this case, all parts of the fuel cell may be constructed from solid materials, because the proton conductor itself is a solid. Therefore, the structure is simplified. Further, no liquid leakage occurs, and hence the frequency of required maintenance operations can be remarkably reduced.

One known type of proton conductor includes an organic material, which has a functional group, such as a phosphoric acid group or a sulfonic acid group, bonded by substitution to pores of an organic porous body. For example, Japanese Laid-Open Patent Publication No. 2002-83612 describes a proton conductive polymer as an organic material, which is obtained in pores by mutually polymerizing monomers, each of which exhibits proton conductivity. Japanese Laid-Open Patent Publication No. 2002-83514 and International Patent Publication WO 00/54351 describe a proton conductive polymer that is bonded or charged to the pores of a porous body, in order to provide a proton conductive polymer within the pores.

Proton conduction in such a proton conductor is caused by successive occurrence of a phenomenon, in which a proton is dissociated from the functional group, such as a sulfonic acid group, existing at the terminal end, and wherein the proton is bonded by substitution to a proton existing on another functional group.

In the inventions described in Japanese Laid-Open Patent Publication Nos. 2002-83612 and 2002-83514 and International Patent Publication WO 00/54351, it has been postulated that the polymer, which is obtained in the pores, constitutes a cross-linked material, in which principal chains are three-dimensionally bonded to one another, as shown in FIG. 11. Such a cross-linked material becomes highly rigid because of the three-dimensional bonding. Therefore, it is difficult to subject the cross-linked material to oscillation or fluctuation. In the case of the cross-linked material, which is adverse to oscillation or fluctuation, it is difficult for the functional groups to approach one another when the spacing distance between the functional groups, such as sulfonic acid groups, is large. Therefore, proton mobility and proton conductivity are decreased.

SUMMARY OF THE INVENTION

A general object of the present invention is to provide a proton conductor that exhibits excellent proton conductivity.

A principal object of the present invention is to provide a proton conductor that may be used, for example, as a solid electrolyte for a fuel cell.

Another object of the present invention is to provide a method for producing a proton conductor that facilitates bonding of a branched polymer to a porous body or a powder.

According to one aspect of the present invention, there is provided a proton conductor, including a polymer bonded to pores of a porous body, wherein:

the polymer is a branched polymer having a base end moiety and a branched moiety branched from the base end moiety;

one end of the base end moiety is bonded to the pores; and a functional group, from which a proton is capable of being dissociated, exists at a terminal end of the branched moiety.

In the case of the branched polymer described above, the functional group, which participates in and facilitates proton conduction, can be bonded to each of the branched terminal ends by means of substitution. Thus, more specifically, concentration of the functional group is increased. Further, functional groups are disposed extremely close to one another. Therefore, a conduction channel is formed between adjoining functional groups, and hence it is easy to send and receive protons between the functional groups. Therefore, proton conduction occurs with ease and proton conductivity is increased.

In the proton conductor, the branched polymer is bonded to the porous body only at the base end moiety. Therefore, the branched polymer easily fluctuates and mutually adjoining branched polymers can approach one another with ease. As a result, the spacing distance between both conduction channels of adjoining branched polymers can be decreased. Thus, protons are easily sent and received between mutually adjoining branched polymers as well, and excellent proton conductivity is exhibited.

Further, when at the same temperature, the branched polymer exhibits a lower viscosity as compared to a cross-linked material and a straight chain polymer. Therefore, proton conductivity of the branched polymer is higher than in the case of a cross-linked material and a straight chain polymer at identical temperatures.

Japanese Laid-Open Patent Publication No. 2003-183244, described above, suggests that a proton conductor composed of a hyperbranch polymer per se be adopted as an electrolyte membrane. However, the present invention differs from the invention described in Japanese Laid-Open Patent Publication No. 2003-183244, in that the hyperbranch polymer is bonded to the pore surface of a porous body.

It is preferable that the branched polymer further includes an additional branched moiety, which branches from the branched moiety. Accordingly, functional group concentration can be increased and proton conductivity may be further improved.

Exemplary functional groups include functional groups that exhibit enhanced properties as proton donors, in other words, functional groups having high acid strengths. Specifically, it is preferable to use a sulfonic acid group or a phosphoric acid group.

According to another aspect of the present invention, a method is provided for producing a proton conductor, wherein the proton conductor includes a branched polymer bonded to pores of a porous body, the method comprising the steps of:

forming, on a surface of a powder, a branched polymer having a base end moiety, and a branched moiety branched from the base end moiety;

bonding, by substitution, a functional group from which a proton is capable of being dissociated, to a terminal end of the branched polymer; and forming the powder to prepare the porous body.

More specifically, in the aforementioned production method, a branched polymer is first bonded to a powder, and then the powder is formed, for producing a proton conductor.

It is also allowable to use a powder in which a modification group, to which the base end moiety of the branched polymer is to be bonded, is bonded beforehand to the powder. In general, it is difficult to bond a branched polymer to the powder. However, when the modification group is present and bonded to the powder beforehand, the branched polymer can be bonded to the polymer with ease.

As described above, for example, it is preferable that a sulfonic acid group or a phosphoric acid group is bonded by substitution as the functional group.

According to still another aspect of the present invention, there is provided a method for producing a proton conductor, wherein the proton conductor includes a branched polymer bonded to pores of a porous body, the method comprising the steps of:

bonding a modification group to a surface of the porous body;

bonding a base end moiety of the branched polymer to the modification group;

forming a branched moiety branched from the base end moiety; and bonding, by substitution, a functional group from which a proton is capable of being dissociated, to a terminal end of the branched polymer.

According to this production method, it is also possible to bond the branched polymer to the porous body itself.

In the same manner as described above, it is preferable that a sulfonic acid group or a phosphoric acid group be bonded by substitution as the functional group.

According to the present invention, the branched polymer, which easily fluctuates, has a high functional group concentration, and relatively high fluidity, is bonded to the porous body. Therefore, it is possible to obtain a proton conductor that exhibits excellent proton conductivity.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6A shows a magnified view illustrating major parts depicting a state in which phosphoryl chloride attacks a hydroxyl group disposed at the terminal end of bis-MPA, and FIG. 6B shows a magnified view illustrating major parts depicting a state in which phosphoryl chloride is bonded by substitution to the terminal end of bis-MPA;

FIG. 9A shows a magnified view illustrating major parts depicting a state in which a silanol group attacks a hydroxyl group disposed on the surface of a $SiO_2$ bulk, and FIG. 9B shows a magnified view illustrating major parts depicting a state in which a modification group is bonded to the $SiO_2$ bulk;

DESCRIPTION OF THE PREFERRED EMBODIMENTS

With reference to the accompanying drawings, explanations shall be given concerning a proton conductor, and the method for producing the same, according to preferred embodiments of the present invention.

Figure 1:
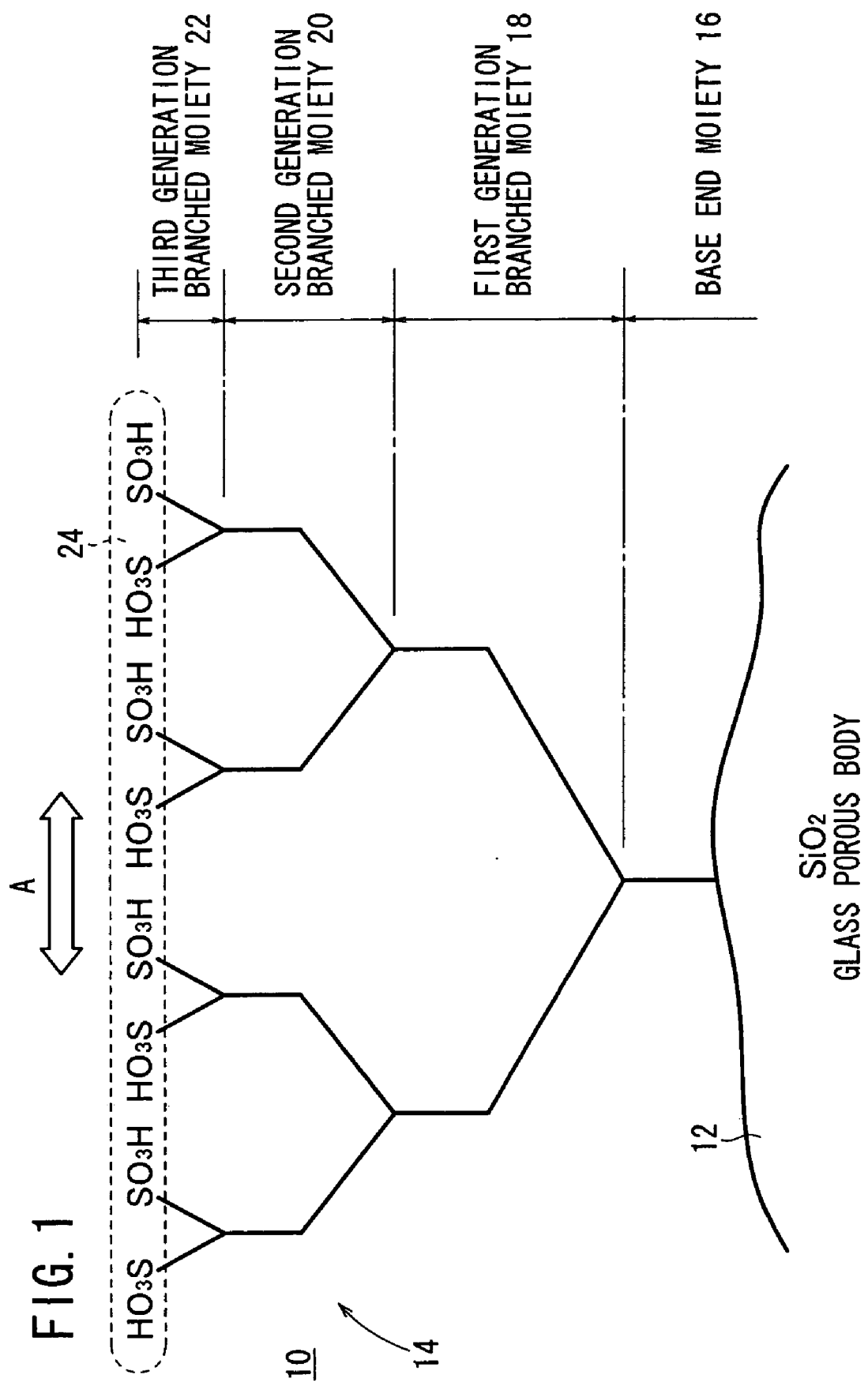
FIG. 1 shows a magnified view illustrating major parts of a proton conductor according to an embodiment of the present invention.

FIG. 1 shows a magnified view illustrating major parts of a proton conductor according to an embodiment of the present invention. The proton conductor 10 includes a hyperbranch polymer 14, which forms a branched polymer bonded to a pore surface existing on a $SiO_2$ glass porous body 12.

In the embodiment of the present invention, the hyperbranch polymer 14 includes a base end moiety 16, a first generation branched moiety 18 branched from the base end moiety 16, a second generation branched moiety 20 further branched from the first generation branched moiety, and a third generation branched moiety 22 further branched from the second generation branched moiety 20. In particular, the base end moiety 16 is bonded to the pore surface of a $SiO_2$ glass porous body 12. The sulfonic acid group, as a functional group, from which a proton is capable of being dissociated, is bonded by substitution to the terminal end of the third generation branched moiety 22.

As shown in FIG. 1, in the hyperbranch polymer 14, sulfonic acid groups can be bonded by substitution to the branched terminal ends respectively. Therefore, the sulfonic acid group concentration is increased. Further, in this case, the sulfonic acid groups existing at the terminal ends are disposed extremely close to one another. Therefore, protons are easily sent and received between adjoining sulfonic acid groups. More specifically, a high acid strength region is formed, having enhanced properties as a proton donor. Further, a conduction channel 24, in which protons are easily movable in the directions of the arrow A, is formed between the sulfonic acid groups.

Figure 11:
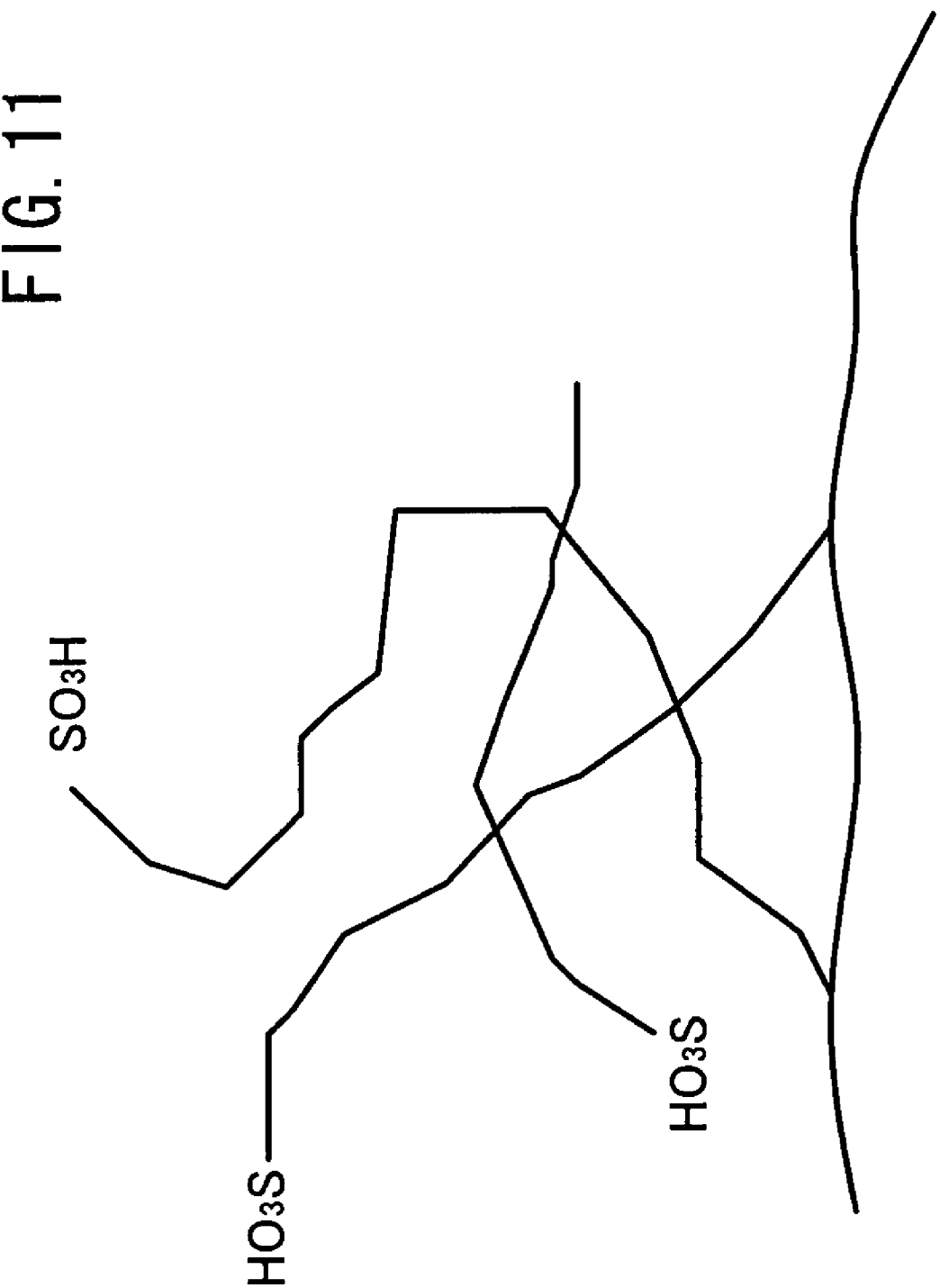
FIG. 11 shows a magnified view illustrating major parts depicting a proton conductor formed according to a conventional technique, in which a cross-linked material having a sulfonic acid group at the terminal end thereof is bonded to the surface of a porous body.

In the proton conductor 10, the hyperbranch polymer 14 is bonded to the SiO$_2$ glass porous body 12 only at the base end moiety 16. Therefore, the binding force exerted on the hyperbranch polymer 14 is smaller than the binding force exerted on the cross-linked material that is bonded to the porous body at a plurality of positions, as shown in FIG. 11. Therefore, the hyperbranch polymer 14 is oscillated or fluctuates relatively easily.

When the hyperbranch polymer 14 fluctuates, even if adjoining hyperbranch polymers 14 are relatively widely separated from each other before fluctuating, the hyperbranch polymers 14 still may approach one another. That is, the spacing distance of both conduction channels 24 is decreased between adjoining hyperbranch polymers 14. Therefore, protons are easily sent and received between adjoining hyperbranch polymers as well. As a result, excellent proton conduction is exhibited.

Further, the hyperbranch polymer 14 has a viscosity lower than the viscosities of the cross-linked material and the straight chain polymer at an identical temperature. Therefore, at the same temperature, the hyperbranch polymer 14 exhibits relatively high proton conductivity, as compared with the cross-linked material or the straight chain polymer.

Figure 2:
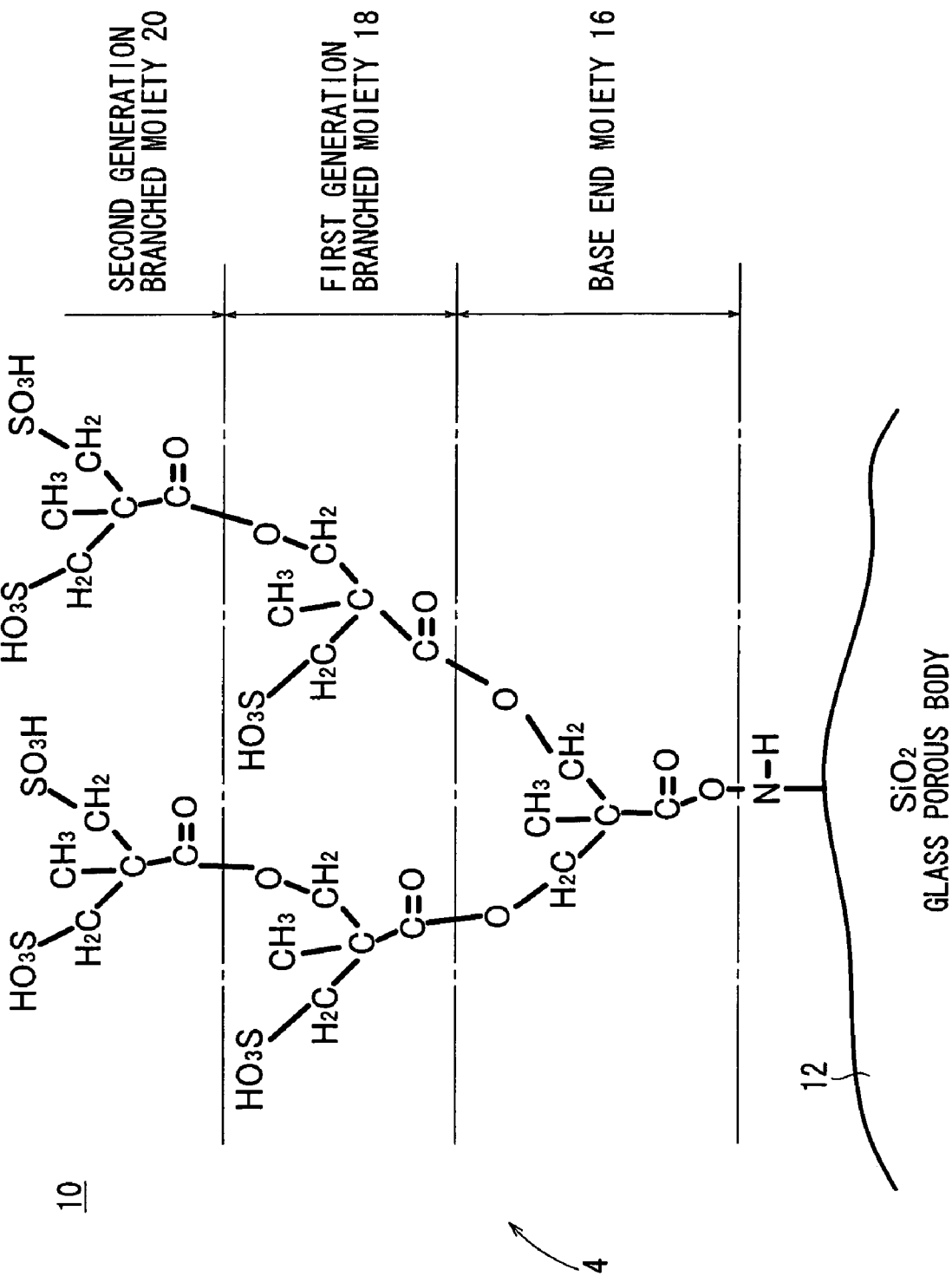
FIG. 2 shows a magnified view illustrating major parts of a proton conductor to which a branched polyester polymer is bonded as a hyperbranch polymer.

As shown in FIG. 2, the repeating unit of the hyperbranch polymer 14 is exemplified by 2,2-bis(hydroxymethyl)propionic acid (bis-MPA), which is an AB$_2$ type monomer. More specifically, an AB$_2$ type monomer herein refers to a monomer that has two types of functional groups, A and B, in the monomer unit, made up of one A and two B's. The functional group A and the functional group B can be reacted with each other. In the case of bis-MPA, a carboxyl group corresponds to the functional group A, and a hydroxyl group corresponds to the functional group B. That is, bis-MPA is a monomer having one carboxyl group and two hydroxyl groups. In this embodiment, the hyperbranch polymer 14 is a branched polyester polymer, in which bis-MPA's are bonded as the repeating unit in the branched form.

In the present embodiment, the base end moiety 16 is bonded to the pore surface of the SiO$_2$ glass porous body 12 via an amino group. FIG. 2 shows moieties ranging to the second generation branched moiety 20.

As shown in FIG. 2, it is not necessarily indispensable that the second generation branched moiety 20 be bonded to all terminal ends of the first generation branched moiety 18. In other words, the second generation branched moiety 20 may be bonded only to a portion of the terminal ends of the first generation branched moiety 18, wherein functional groups, such as phosphoric acid groups and sulfonic acid groups, may be bonded by substitution to the remaining terminal ends of the first generation branched moiety 18.

Figure 3:
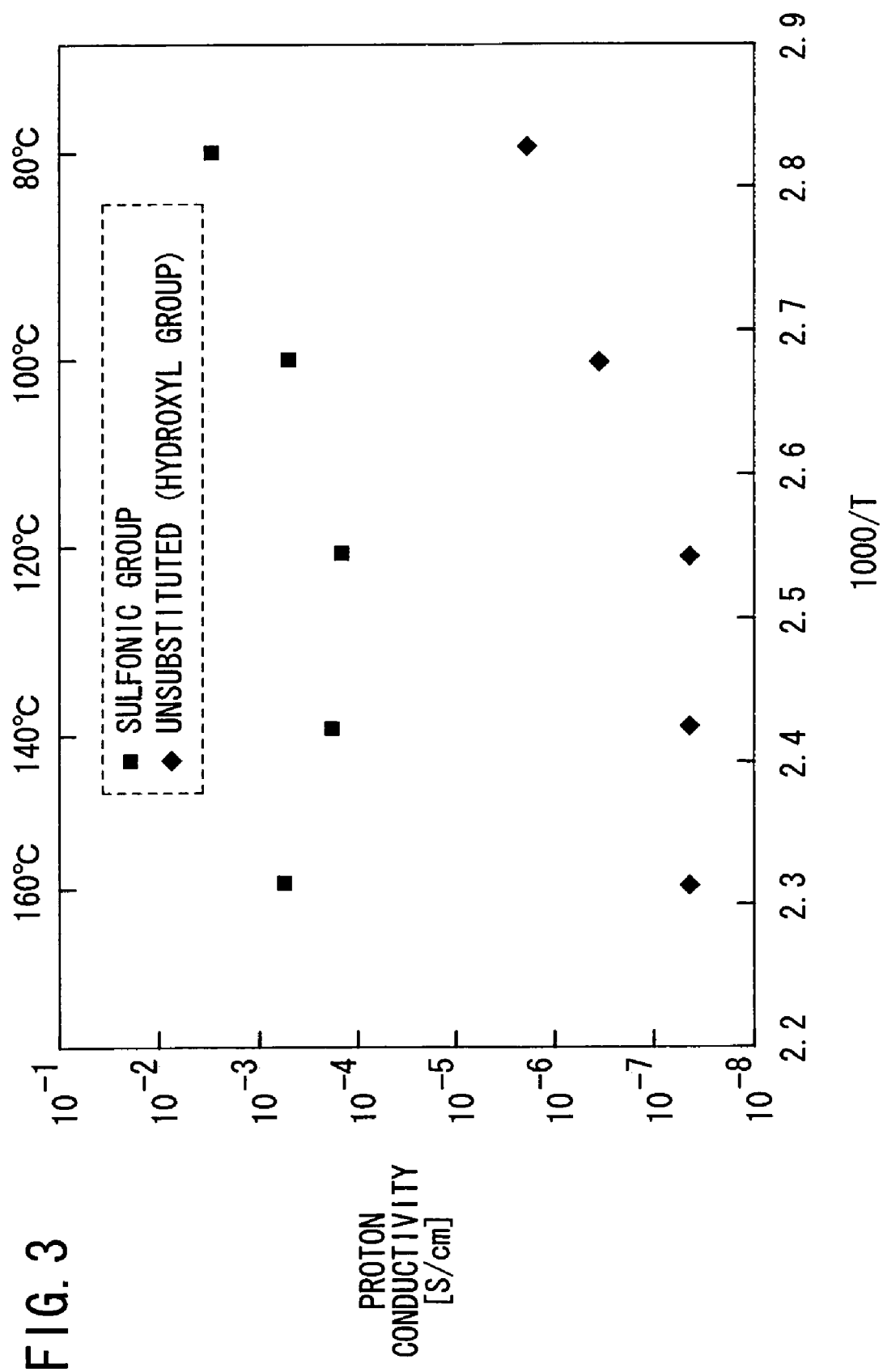
FIG. 3 shows a graph illustrating the relationship between temperature and proton conductivities of $SiO_2$ glass porous bodies, to which there are bonded, respectively, an unsubstituted branched polyester polymer and a branched polyester polymer in which a hydroxyl group is substituted with a sulfonic acid group.

FIG. 3 shows, in combination, proton conductivities of a SiO$_2$ glass porous body bonded with an unsubstituted branched polyester polymer terminated with a hydroxyl group, and a SiO$_2$ glass porous body bonded with a branched polyester polymer in which the hydroxyl group is substituted with a sulfonic acid group. In FIG. 3, the result of the unsubstituted material is indicated by solid diamonds, and the result of the substituted material is indicated by solid squares. As indicated in FIG. 3, it is clear that the proton conductivity of the unsubstituted material is extremely low, whereas proton conductivity is remarkably improved by introducing the sulfonic acid group.

Referring to FIG. 3, it is also understood that the proton conductivity of the substituted material is increased in a temperature region exceeding 120° C. The reason for this fact is postulated as follows. That is, the branched polyester polymer, which forms a hyperbranch polymer, is softened, and thus proton mobility is improved.

Proton conductivity was measured as follows. Two Au wires were secured to a quadratic prism-shaped test piece, having dimensions of 4.5 mm×3 mm×15 mm, with Ag electrodes adhered to the Au wires as lead wires. Under this condition, an impedance analyzer, manufactured by Solartron, was used to perform measurements, using a two-terminal method, while the measuring frequency was 0.1 to 1 MHz and the applied voltage was 10 to 30 mV. As for the atmosphere, the fuel utilization factor was assumed to be 50% without external humidification. The same measurement technique was also performed for subsequent measurements.

Figure 4:
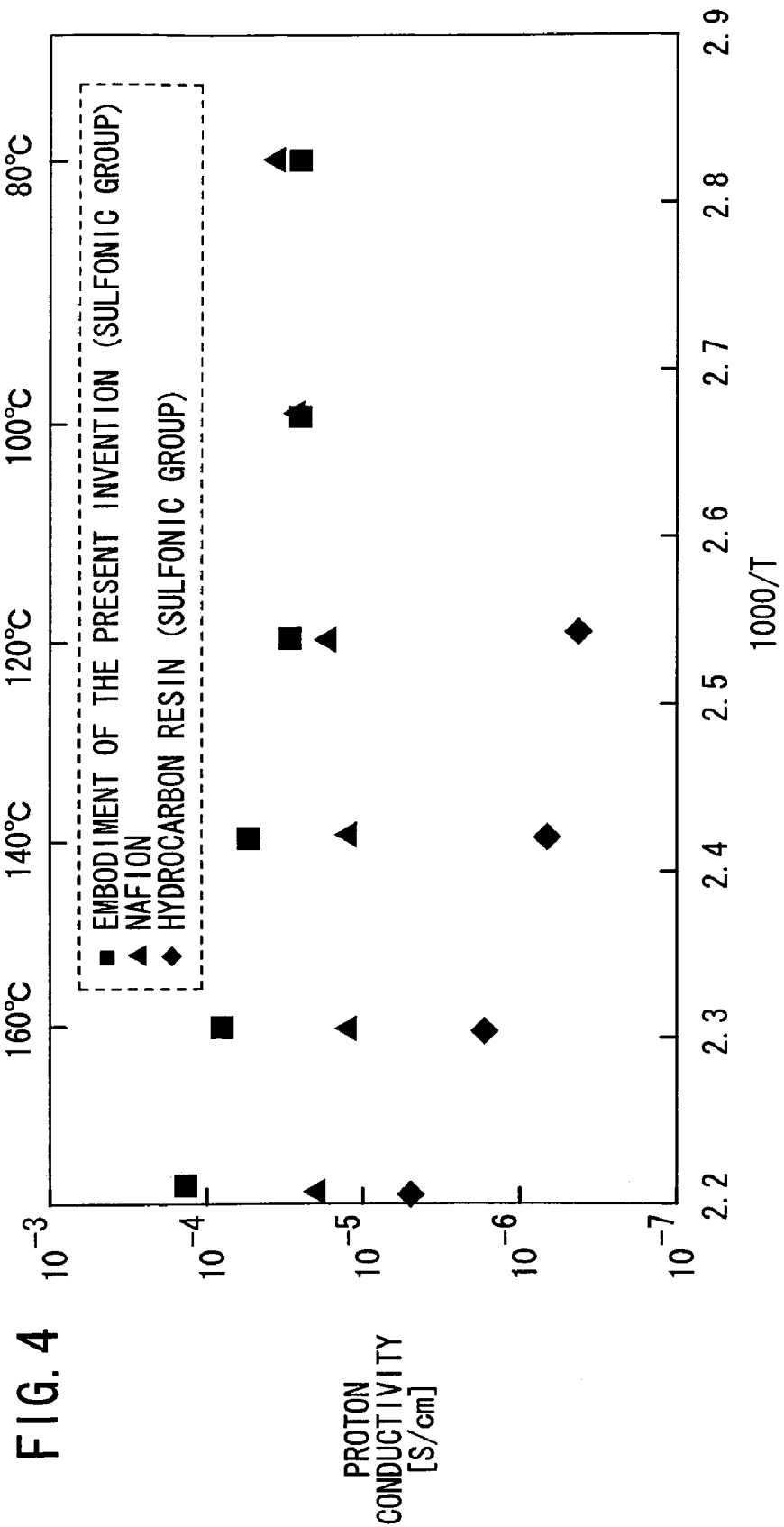
FIG. 4 shows a graph illustrating the relationship between temperature and proton conductivity, in a non-humidified state, with respect to a proton conductor according to an embodiment of the present invention, Nafion, and a hydrocarbon-based resin having a sulfonic acid group.

As described above, the proton conductor 10 has a conduction channel 24 that easily fluctuates, and which has a low viscosity. Therefore, the proton conductor 10 exhibits excellent proton conduction even in a dry state. Specifically, in the case of Nafion (registered trademark), as indicated by the solid triangle symbols in FIG. 4, proton conductivity is suddenly lowered when the temperature exceeds 100° C. in a non-humidified state. However, by contrast, in the case of a SiO$_2$ glass porous body bonded with a branched polyester polymer having a sulfonic acid group (solid square symbols), high proton conductivity is exhibited, even when the temperature exceeds 100° C. in the non-humidified state. In FIG. 4, the diamond-shaped symbols indicate the proton conductivity of a hydrocarbon-based resin having a sulfonic acid group.

Next, a method for producing a proton conductor according to an embodiment of the present invention shall be explained.

First, an explanation shall be made concerning a first production method, in which a branched polyester polymer, as a hyperbranch polymer 14, is bonded to the surface of a SiO$_2$ powder to thereby prepare a modified powder, wherein a SiO$_2$ glass porous body 12 is produced using the modified powder. For the sake of convenience and to simplify the explanation, it shall be assumed that the branched moiety is exemplified only by the first generation branched moiety 18.

First, a SiO$_2$ powder with an aminated surface (for example, having an average particle size of 12 nm, and a specific surface area of 200 m$^2$/g), bis-MPA, and p-toluenesulfonic acid, serving as a catalyst, are mixed at a ratio of about 1:20:0.1 (numerical values indicate parts by weight, with units being expressed in the same manner in the following explanations), and thereafter the mixture is accommodated in an agitation vessel.

Figure 5A:
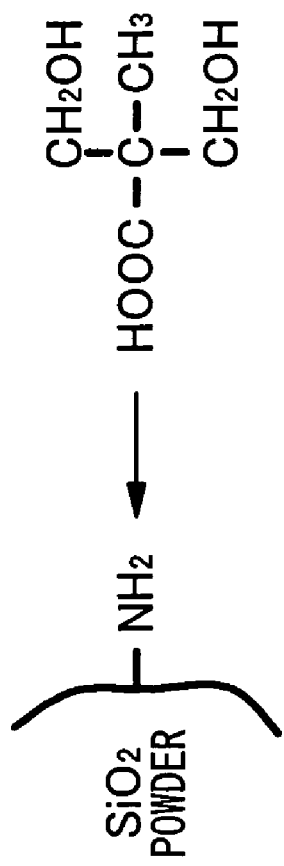
FIG. 5A shows a magnified view illustrating major parts depicting a state in which bis-MPA attacks an amino group disposed on a $SiO_2$ powder surface.
Figure 5B:
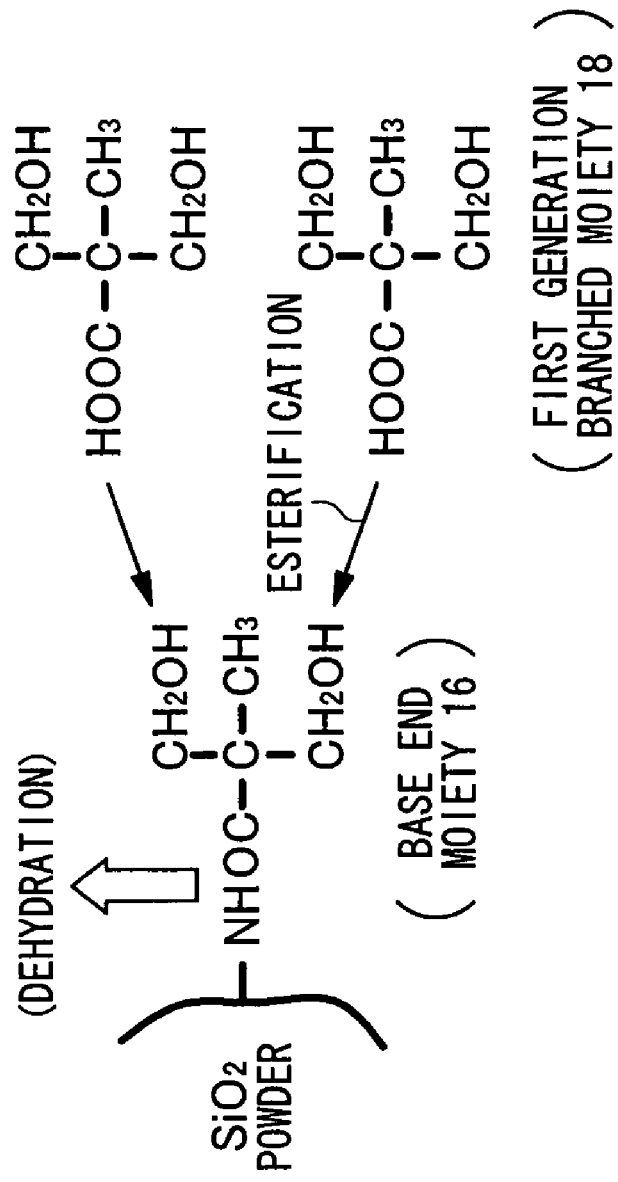
FIG. 5B shows a magnified view illustrating major parts depicting a state in which bis-MPA is bonded to a $SiO_2$ powder surface via an amino group.

When the temperature in the agitation vessel is raised to 190° C. while allowing Ar, as a carrier gas, to flow within the agitation vessel, as shown in FIG. 5A, bis-MPA attacks the amino group disposed on the SiO$_2$ powder surface. As a result, as shown in FIG. 5B, an addition reaction is caused accompanied by the dehydration, and bis-MPA becomes bonded to the SiO$_2$ powder surface via the amino group. The bis-MPA serves as the base end moiety 16. Water, produced by the addition reaction, is eliminated through accompaniment with the carrier gas.

When the temperature is continuously retained at 190° C., non-bonded bis-MPA attacks the hydroxyl group disposed at the terminal end of the bis-MPA serving as the base end moiety 16 (see FIG. 5B). Accordingly, esterification is caused, thereby adding the first generation branched moiety 18, which is branched from the base end moiety 16.

SiO$_2$ powder, which is bonded with the branched polyester polymer provided with the branched moiety as described above, is successively washed with tetrahydrofuran (THF) and water to remove any unreacted matter, followed by drying.

Subsequently, the dried material is dispersed in a solvent such as pyridine, cyclohexane, or THF, and a supersaturated amount of phosphoryl chloride is added, as shown in FIG. 6A, followed by being left to stand overnight at room temperature. Accordingly, the hydroxyl group disposed at the terminal end of the branched polyester polymer is substituted with a phosphoryl chloride group, as shown in FIG. 6B.

Figure 7A:
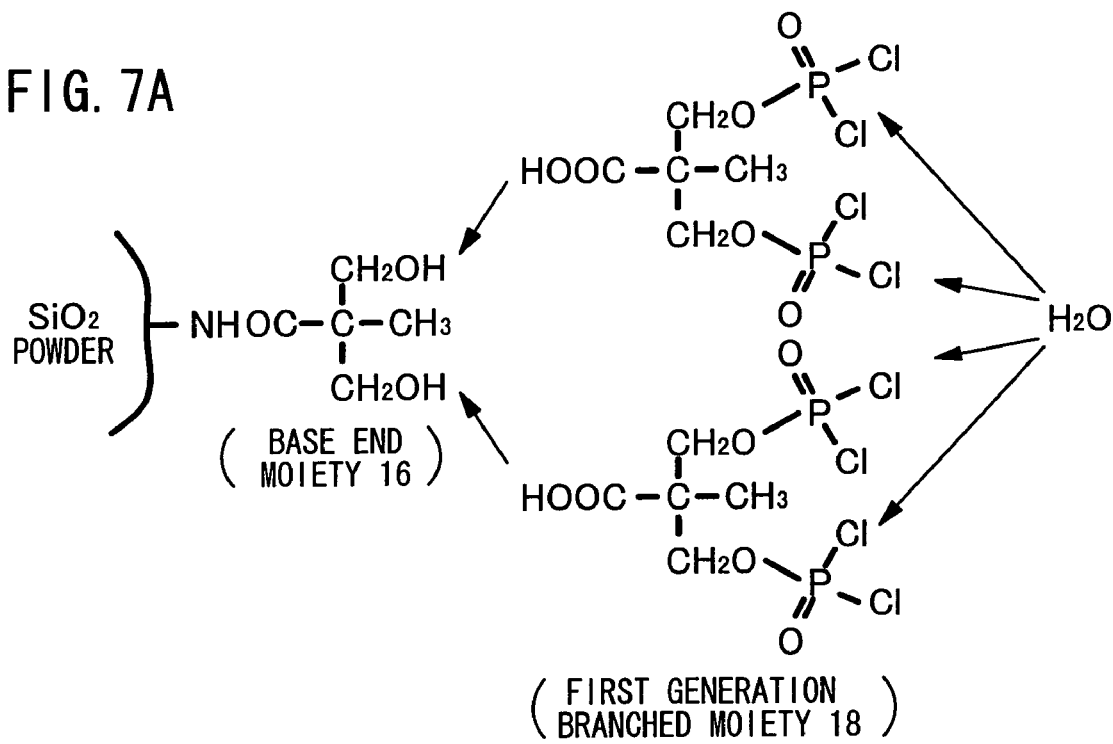
FIG. 7A shows a magnified view illustrating major parts depicting a state in which $H_2O$ attacks phosphoryl chloride bonded by substitution to the terminal end of bis-MPA.
Figure 7B:
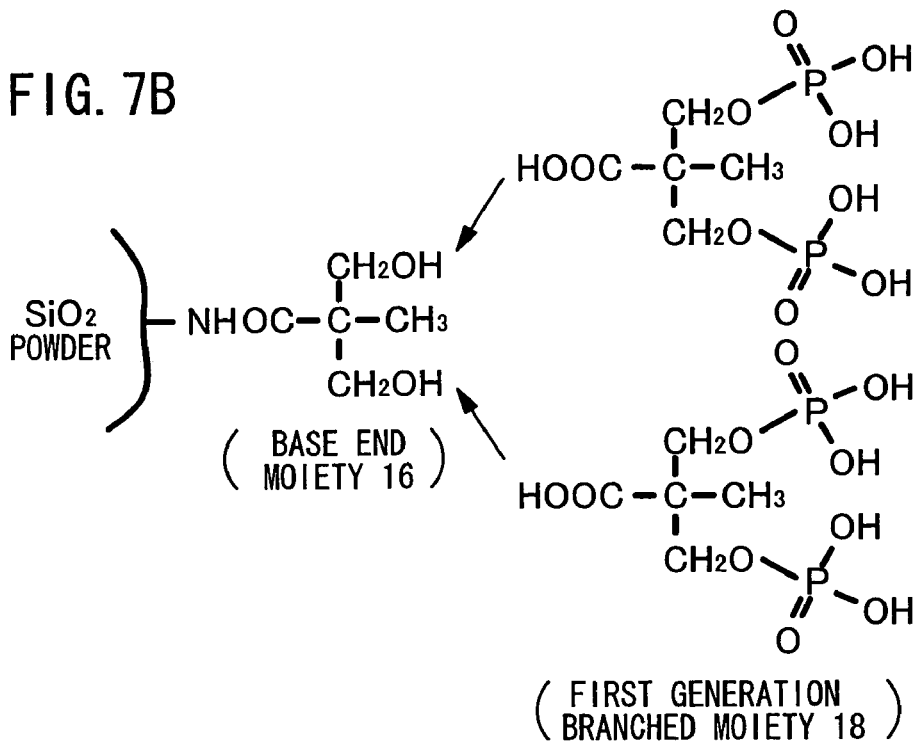
FIG. 7B shows a magnified view illustrating major parts depicting a state in which phosphoryl chloride is converted into a phosphoric acid group.

Thereafter, when the temperature is raised to 70° C. to perform hydrolysis, as shown in FIG. 7A, the phosphoryl chloride group is changed into a phosphoric acid group, as shown in FIG. 7B. Subsequently, after washing and drying are performed, a $SiO_2$ powder is obtained, which is bonded with a branched polyester polymer having a branched moiety, and wherein the terminal end is substituted with the phosphoric acid group.

In order to form the powder into a proton conductor having a predetermined shape, a forming process may be applied to the powder. For example, in order to obtain a quadratic prism-shaped test piece, having dimensions as described above, cold isotropic pressure processing may be performed, at a pressure of 4 ton/m$^2$.

When a $SO_3$ complex is added in place of phosphoryl chloride, a $SiO_2$ powder is obtained, which is bonded with a branched polyester polymer having a branched moiety, and wherein its terminal end is substituted with a sulfonic acid group.

Figure 8:
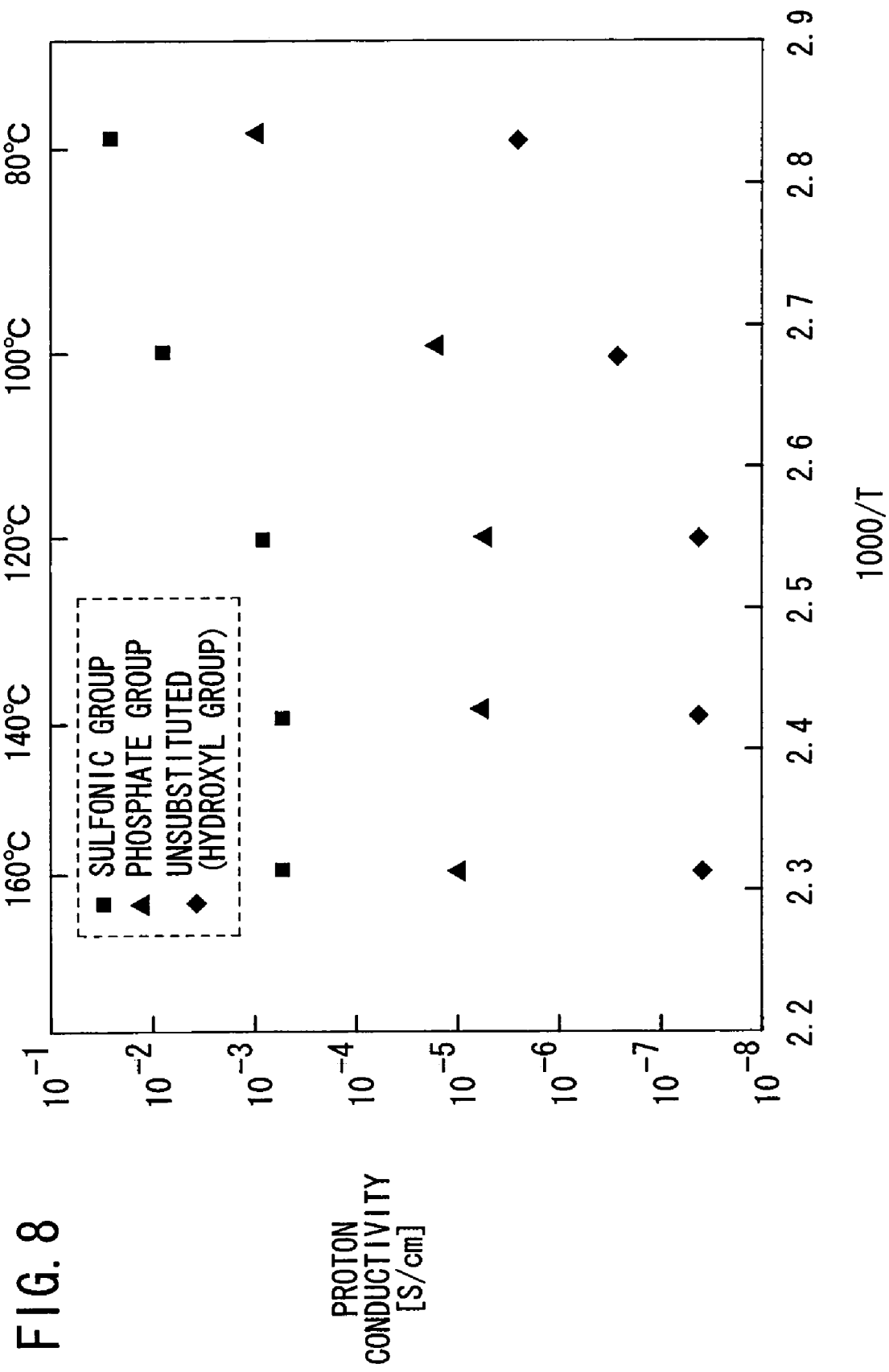
FIG. 8 shows a graph illustrating the relationship between temperature and proton conductors bonded with branched polyester polymers having branched moieties, wherein terminal ends thereof are substituted with a phosphoric acid group and a sulfonic acid group, respectively, and a proton conductor based on an unsubstituted material.

$SiO_2$ powders, which were bonded with branched polyester polymers having terminal ends substituted with a phosphoric acid group and a sulfonic acid group respectively, were formed. Thus, proton conductors 10 were prepared having proton conductivities, which are shown in FIG. 8 together with the proton conductivity of an unsubstituted material. In FIG. 8, the solid diamond symbols indicate the proton conductivity of the unsubstituted material, the solid triangle symbols indicate the proton conductivity of the proton conductor 10 having a branched polyester polymer with a phosphoric acid group terminal end, and the solid square symbols indicate the proton conductivity of the proton conductor 10 having a branched polyester polymer with a sulfonic acid group terminal end. Referring to FIG. 8, it will be appreciated that a proton conductor 10, which exhibits high proton conductivity, can be obtained by bonding and substitution, wherein the sulfonic acid group has a relatively high acid strength.

Next, an explanation shall be given concerning a second production method, in which a hyperbranch polymer 14 is bonded to the surface of a bulk $SiO_2$ glass porous body.

First, the $SiO_2$ glass porous body 12 and a 50 ml toluene solution of 1 mmol/g equivalent of γ-aminopropyltriethoxysilane are accommodated in an agitation vessel, and reflux is performed for 6 hours while allowing Ar to flow so that the reaction is advanced. Accordingly, as shown in FIG. 9A, an ethoxy group of γ-aminopropyltriethoxysilane, as a coupling agent, attacks the hydroxyl group existing on the surface of the $SiO_2$ glass porous body 12. Finally, a silanol group on the surface of the $SiO_2$ glass porous body 12 reacts with the coupling agent, and Si is bonded to O existing at the terminal end of the $SiO_2$ glass porous body 12, as shown in FIG. 9B.

In the following steps, bis-MPA is bonded by substitution to the terminal end amino group, in accordance with the first production method. Accordingly, bis-MPA is bonded to the surface of the $SiO_2$ glass porous body 12 via the remaining functional group of γ-aminopropyltriethoxysilane. The bis-MPA serves as the base end moiety 16.

Thereafter, in the following steps, a first generation branched moiety 18 is provided, in the same manner as in the first production method, and then a phosphoric acid group or a sulfonic acid group is bonded by substitution to the terminal end. Thus, a branched polyester polymer, i.e., a hyperbranch polymer 14, is bonded to the surface of the $SiO_2$ glass porous body 12 as a bulk.

Figure 10:
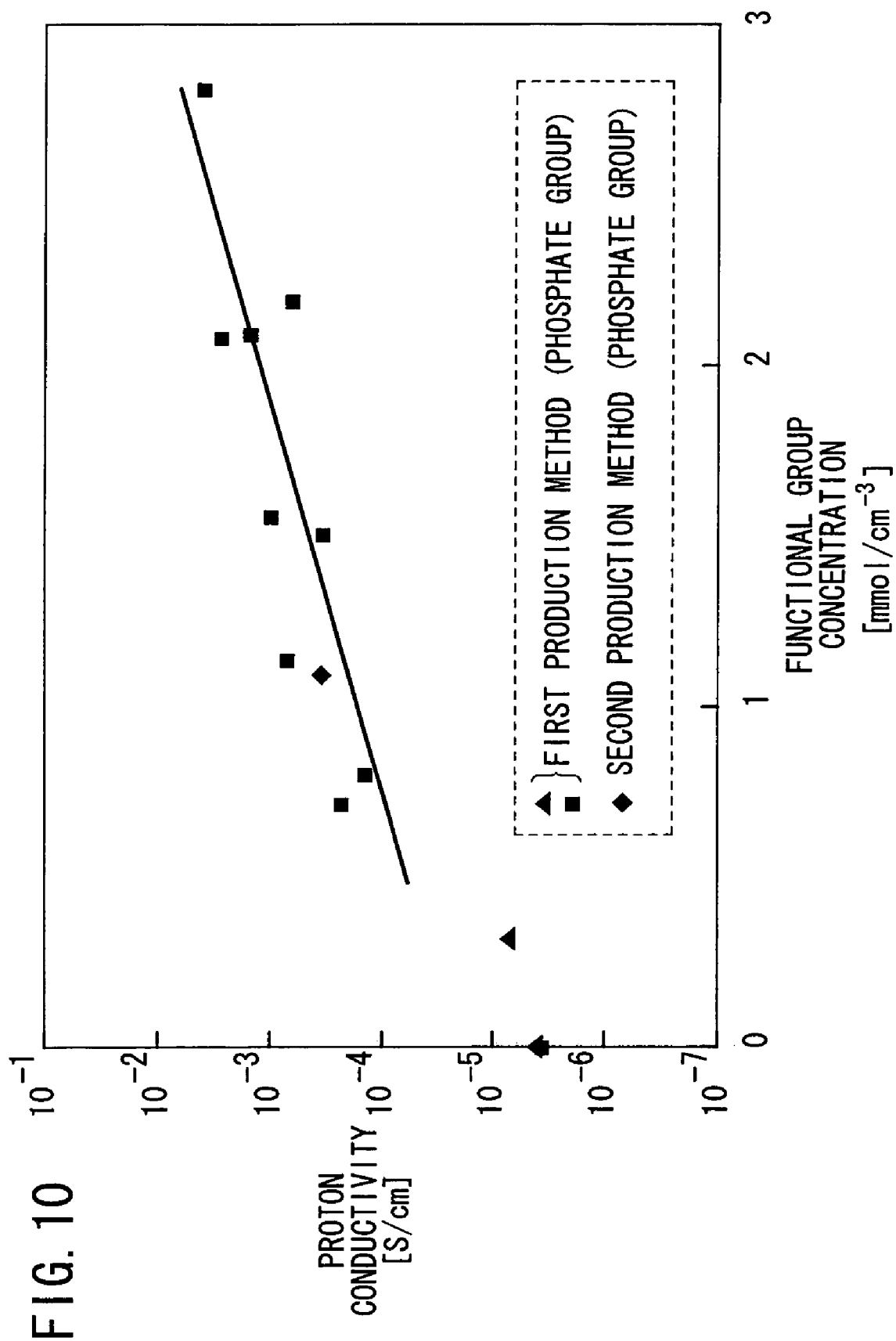
FIG. 10 shows a graph illustrating the relationship between concentration and proton conductivity of the proton conductor, produced according to a first method or a second method of the present invention.

FIG. 10 shows proton conductivities at 80° C. of proton conductors 10 manufactured in accordance with the first production method and the second production method. In FIG. 10, the $SiO_2$ glass porous body obtained by the second production method, and which comprises a branched polyester polymer, has a proton conductivity as indicated by the solid diamond symbols. On the other hand, all of the bodies indicated by the solid triangle and solid square symbols are $SiO_2$ glass porous bodies, each having a polyester polymer obtained according to the first production method. In the respectively indicated bodies, a $SiO_2$ powder bonded with the polyester polymer is dispersed in cyclohexane or pyridine, to undergo a reaction when a supersaturated amount of phosphoryl chloride is added, followed by being hydrolyzed and washed. In all of the proton conductors, the terminal end functional group is a phosphoric acid group, wherein the horizontal axis indicates the phosphoric acid group concentration.

Referring to FIG. 10, it is clear that proton conductivity is changed depending on the phosphoric acid group concentration, irrespective of the production method, and proton conductivity is increased when the phosphoric acid group concentration is raised. In order to control the concentration of the functional group, such as the phosphoric acid group, the amount of phosphoryl chloride may be appropriately increased or decreased.

When the ratio of added phosphoryl chloride is constant, phosphoric acid group concentration can be controlled by appropriately increasing or decreasing the amount of the applied polyester polymer.

In the foregoing embodiments, an explanation of the invention has been given, exemplified by a case in which a hyperbranch polymer, having a repeating unit of polyester, is produced. However, the hyperbranch polymer is not necessarily limited by such a feature. It is acceptable to use other materials which are polymerizable in a branched form, and which have any functional group, from which a proton is capable of being dissociated at its terminal end. For example, other $AB_2$ type monomers may include, for example, 3,5-dihydroxy-benzoic acid having a benzene ring skeleton.

Alternatively, it is allowable to use an $AB_3$ type monomer, i.e., a monomer having two types of functional groups in the monomer unit, and which has one A and three B's. Preferred examples for the $AB_3$ type monomer, which has a carboxyl group as the functional group A and a hydroxyl group as the functional group B, may include, for example, trimethylolacetic acid and triethylolacetic acid.

The branched polymer is not limited to being a hyperbranch polymer, but may be any dendrimer that exhibits higher symmetry. The hyperbranch polymer or the dendrimer may be copolymers, or polymers in which the repeating unit of the base end moiety bonded to the porous body is different from that of the branched moiety branched from the base end moiety.

The substance used to bond the phosphoric acid group or the sulfonic acid group by substitution is not limited to phosphoryl chloride and a $SO_3$ complex, but may consist of any substance, provided that the phosphoric acid group or the sulfonic acid group is bonded by substitution to the terminal end of the hyperbranch polymer or the dendrimer.

The porous body has been exemplified by a $SiO_2$ glass porous body. However, it goes without saying that porous bodies other than the above may also be used. For example, when any of fine powders of $ZrO_2$, $Al_2O_3$, MgO, $La_2O_3$ or spinel are used as the raw material, it is also possible to produce a proton conductor in which the hyperbranch polymer may be bonded to a glass porous body other than the $SiO_2$ glass porous body. Further, the porous body is not limited to an inorganic material, but may also be an organic material such as fluorocarbon resin (for example, PTFE).

While the invention has been particularly shown and described with reference to preferred embodiments, it will be understood that variations and modifications can be effected thereto by those skilled in the art without departing from the spirit and scope of the invention as defined by appended claims.

What is claimed is:

1. A proton conductor including a polymer bonded to pores of a porous body, wherein:
    said polymer is a repeating unit branched polymer having a base end moiety, and a branched moiety branched from said base end moiety;
    one end of said base end moiety is bonded to said pores; and
    a functional group, from which a proton is capable of being dissociated, exists at a terminal end of said branched moiety; and
    wherein said repeating unit branched polymer comprises an $AB_2$ or $AB_3$ type monomer.

2. The proton conductor according to claim 1, wherein said branched polymer further includes an additional branched moiety that is branched from said branched moiety.

3. The proton conductor according to claim 1, wherein said functional group comprises a sulfonic acid group or a phosphoric acid group.

4. The proton conductor according to claim 1, wherein said repeating unit of said branched polymer comprises a 2,2-bis(ydroxymenthyl)propionic acid (bis-MPA) or a 3,5-dihydroxybenzoic acid.

5. The proton conductor according to claim 1, wherein said repeating unit of said branched polymer comprises trimethylolacetic acid or triethylolacetic acid.

6. The proton conductor according to claim 1, wherein said porous body comprises a glass porous body or fluorocarbon resin.

7. The proton conductor according to claim 6, wherein said fluorocarbon resin comprises PTFE.

* * * * *